US006839734B1

(12) United States Patent
Vega-Garcia et al.

(10) Patent No.: US 6,839,734 B1
(45) Date of Patent: Jan. 4, 2005

(54) MULTIMEDIA COMMUNICATIONS SOFTWARE WITH NETWORK STREAMING AND MULTI-FORMAT CONFERENCING

(75) Inventors: Andres Vega-Garcia, Newcastle, WA (US); Mu Han, Renton, WA (US); Donald R. Ryan, Redmond, WA (US); Thomas Pfenning, Richmond, WA (US); Rajeev Byrisetty, Bellevue, WA (US); Stefan Solomon, Bellevue, WA (US); Michael Clark, Logan, UT (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,884

(22) Filed: Sep. 21, 1998

(51) Int. Cl.[7] .......................... G06F 15/16; H04L 12/16
(52) U.S. Cl. .................... 709/204; 379/93.21; 379/158; 379/202.01; 370/260; 370/269
(58) Field of Search ................................. 709/203, 204; 379/93.21, 96, 88.13, 93.09, 202, 158, 202.1; 348/15, 330, 329, 972, 118; 455/6.3, 31.1; 370/260–263; 340/825.24, 825.25; 345/733–747; 375/147

(56) References Cited

U.S. PATENT DOCUMENTS

| 4,377,861 A | * | 3/1983 | Huffman ..................... 370/112 |
| 5,802,281 A | * | 9/1998 | Clapp et al. .................. 710/11 |
| 5,835,129 A | * | 11/1998 | Kumar ......................... 348/15 |
| 5,841,763 A | * | 11/1998 | Leondires et al. ............ 348/15 |
| 6,049,565 A | * | 4/2000 | Paradine et al. ............ 375/217 |
| 6,122,665 A | * | 9/2000 | Bar et al. .................... 709/224 |
| 6,128,649 A | * | 10/2000 | Smith et al. ................ 709/217 |
| 6,130,880 A | * | 10/2000 | Naudus et al. .............. 370/235 |

FOREIGN PATENT DOCUMENTS

EP 0893926 A2 * 1/1999 ............ H04N/7/52

OTHER PUBLICATIONS

H.323 ITU–T: Audiovisual and multimedia systems, Nov. 1996, pp. 1–71.*
RFC 1890: RTP profile for Audio and Video conferences with minimal control, Shulzrinne, H. Jan. 1996, pp. 1–18.*
ITU Telecommunication Standardization Sector Group, Northlich, B., Boston, Feb. 18–21, 1997, Onlive Technologie Inc. pp. 1–2.*
CU–SeeMe VR immersive desktop teleconferencing, Han, Jefferson; Smith, Brian, ACM Press, Proceedings of 4th ACM International conference on Multimedia, 1996, pp. 199–207.*

* cited by examiner

Primary Examiner—Jack B. Harvey
Assistant Examiner—B. Prieto
(74) Attorney, Agent, or Firm—Perkins Coie LLP

(57) ABSTRACT

Computers, particularly personal computers, have become everyday communications devices, nearly as common as telephones and televisions. A big reason for this is the expansion of computer networks, such as the Internet, which allow sending and receiving information, including audio and video information, from one computer to one or more other computers. Communicating audio and video information between computers can be problematic because users have to wait for the information to be fully downloaded before viewing or hearing it and because different computers sometimes communicate using incompatible communications protocols, which prevents comprehension. Accordingly, the inventors devised new methods, software, and computer systems that support interactive data streaming (real-time exchange of multimedia data) and full-duplex communications, for example, network conferencing, using more than one communications protocol.

8 Claims, 2 Drawing Sheets

MULTIMEDIA COMMUNICATIONS SOFTWARE WITH NETWORK STREAMING AND MULTI-FORMAT CONFERENCING

TECHNICAL FIELD

The present invention concerns computer systems, particularly systems, methods, and software which support real-time multimedia communications across a computer network.

BACKGROUND OF INVENTION

Computers, particularly personal computers, have enjoyed, in recent years, an enormous growth in utility. Early computers allowed users to perform tasks such as word-processing and bookkeeping. Today, however, computers are being used also to manage, display, and manipulate multimedia data, such as digital video and audio. Additionally, computers have become everyday communications devices, nearly as common as telephones and televisions.

Much of this utility growth, especially for communications, stems from the fantastic, compounded growth of computer networks, such as the much heralded Internet.

The Internet, a worldwide network of computers interconnected through private wiring systems and public telephone systems, functions as a planetary communications system for sending and receiving information from one computer to one or more other computers. The information can take almost any form, including text, audio, and video information.

Communicating audio and video information between computers can be problematic in at least two ways. First, many conventional computers include software for handling audio and video information which can be inconvenient to use. For example, many conventional computers include Microsoft's DirectShow software—a system of interconnectable software modules (or filters)—which allows computers to capture multimedia data into data-storage devices, such as hard drives, and to playback, or render, the captured data through their audio-video equipment. Thus, a user having the DirectShow software can link her computer to a website or other computer featuring an audio-video clip, download (or copy) the clip into her local hard drive, and then play back the downloaded copy on her computer. Unfortunately, audio-video clips often include a great amount of data which, in some cases, requires several minutes to download, ultimately inconveniencing the user with a long wait. Accordingly, there is a need to extend software, such as Microsoft's DirectShow software, with features that allow concurrent download and playback, or streaming, of multimedia data.

Second, many conventional computers also include conferencing software, such as Microsoft's NetMeeting (version 2.1) software, which allows two or more computer users to communicate interactively across a computer network via audio-only or audio-video transmissions. A network conference typically requires that each party to the conference communicate using a common protocol not only for organizing and transmitting the audio and video data, but especially for encoding and decoding it. The common protocol ensures that each party to the conference ultimately understands what the other parties are communicating. Unfortunately, not all conferencing software uses the same protocol, frequently preventing users from network conferencing with users having different software. Accordingly, there is a need for network conferencing software that operates with more than one communications protocol.

In sum, there remains a need for a systems, methods and software which support streaming of multimedia data and multimedia conferencing via more than one communications protocol.

SUMMARY

To address these and other needs, the inventors devised several new "pluggable," or interconnectable, software modules for addition to Microsoft's DirectShow software. Some of the modules allow the DirectShow software to handle real-time multimedia data exchange on the network (full-duplex communications), which ultimately allows streaming and network conferencing using more than one communications protocol. One embodiment of the invention includes a module that supports the Real-time Transport Protocol (RTP) for streaming and another includes a demultiplexer module for routing the data, based on its type, to type-specific data handlers and decoders. In another embodiment, the demultiplexer module handles large multiparty conferences by monitoring incoming data streams and dynamically routing a subset of them to appropriate data handlers and decoders.

Another aspect of the invention concerns its modular, dynamically connectable architecture. The architecture includes a core set of modules which may be connected to emulate or form any type of conferencing software. In the exemplary embodiment, this conference software architecture includes an RTP source and rendering module, and RTP demultiplexer, send and receive payload handlers, and a set of decoder and encoder modules to handle various data types.

In its various embodiments, the invention encompasses systems, methods, computers, and computer-readable media of varying scope. In addition to the embodiments and advantages mentioned here, other embodiments and advantages will become apparent from the drawings and the following description.

DETAILED DESCRIPTION OF THE INVENTION

Figure 1:
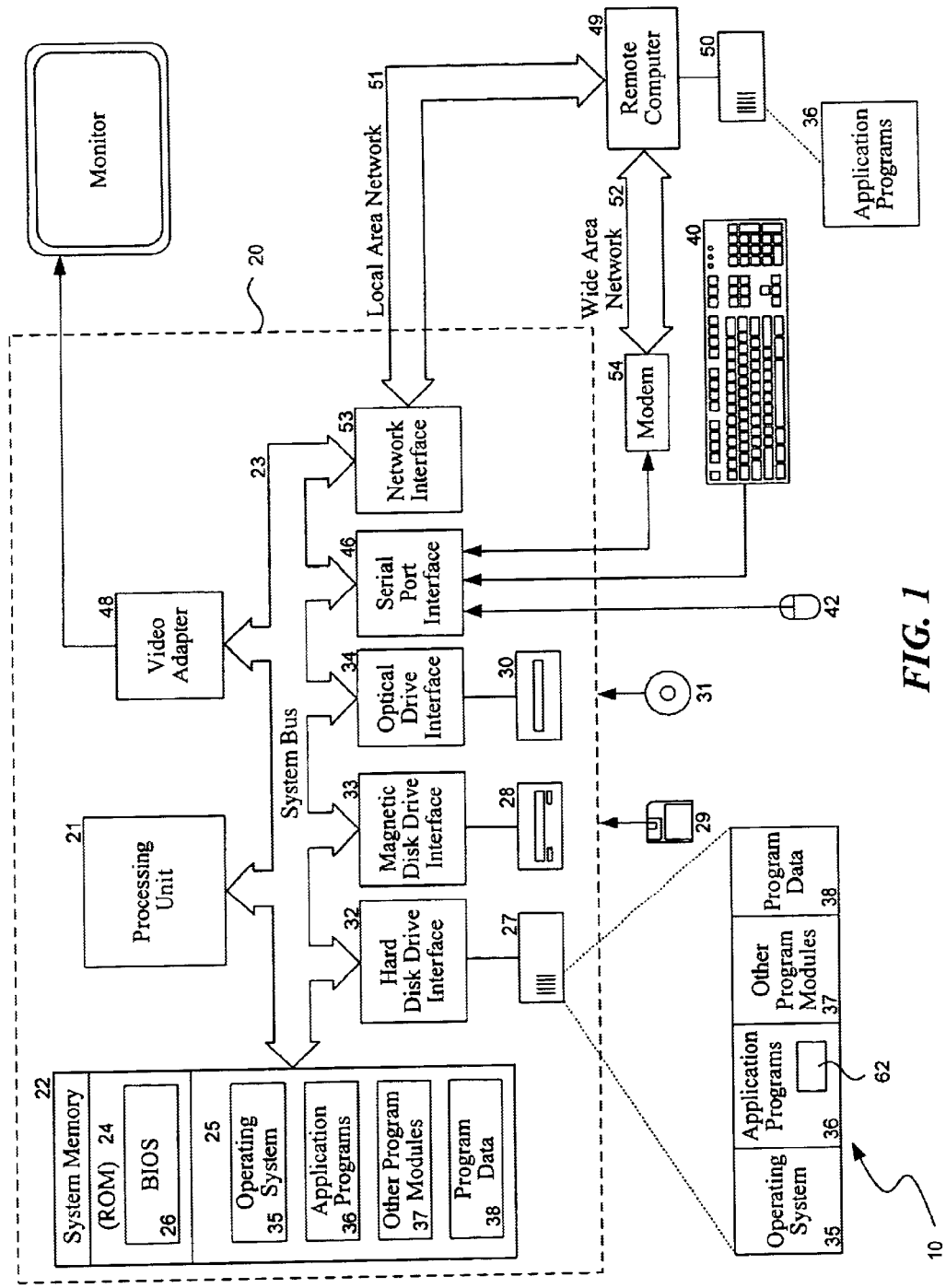
FIG. 1 is a block diagram of an exemplary computer system 10 embodying the invention.

The following detailed description, which references and incorporates FIGS. 1, 2A, and 2B, describes and illustrates one or more exemplary embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Overview

The exemplary embodiment of the invention concerns extensions of Microsoft's Direct Show software, specifically version 2.0, to support streaming and network conferencing using more than one communications protocols.

Exemplary Computer System Embodying the Invention

FIG. 1 shows an exemplary computer system 10 which embodies the invention. The following description of system 10 is intended to provide a brief, general description of suitable computer hardware and a suitable computing environment for implementing the invention. Although not required, the invention is described in the general context of computer-executable instructions, such as program modules, being executed by a computer, such as a personal computer. Generally, program modules include routines, programs, objects, components, data structures, and so forth, that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices linked through a communications network. In a distributed computing environment, program modules may be located in both local and remote memory storage devices.

More particularly, computer system 10 includes a general purpose computing device in the form of a computer 20, including a processing unit 21, a system memory 22, and a system bus 23 that operatively couples various system components including the system memory to processing unit 21. There may be only one or there may be more than one processing unit 21, such that the processor of computer 20 comprises a single central-processing unit (CPU), or a plurality of processing units, commonly referred to as a parallel processing environment. Computer 20 may be a conventional computer, a distributed computer, or any other type of computer. Thus, the invention is not limited to a particular computer.

System bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. ROM 24 stores a basic input/output system (BIOS) 26, containing the basic routines that help to transfer information between elements within the computer 20, such as during start-up. Computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CD ROM or other optical media.

Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for computer 20. Any type of computer-readable media which can store data accessible by a computer, such as magnetic cassettes, flash memory cards, digital video disks, Bernoulli cartridges, random access memories (RAMs), read only memories (ROMs), and the like, can be used in the exemplary operating environment.

A number of program modules are stored on the hard disk, magnetic disk 29, optical disk 31, ROM 24, or RAM 25, including an operating system 35, one or more application programs 36, other program modules 37, and program data 38. Operating system 35 provides numerous functions and services to application programs 36 stored by system memory 22, hard-disk drive 27, and/or hard-disk drive 50. Examples of suitable operating systems include past, present, and future versions of the Microsoft Windows operating system, the Microsoft Windows NT operating system, the IBM OS/2 operating system, and the Apple Computer AppleTalk operating system.

Figure 2:
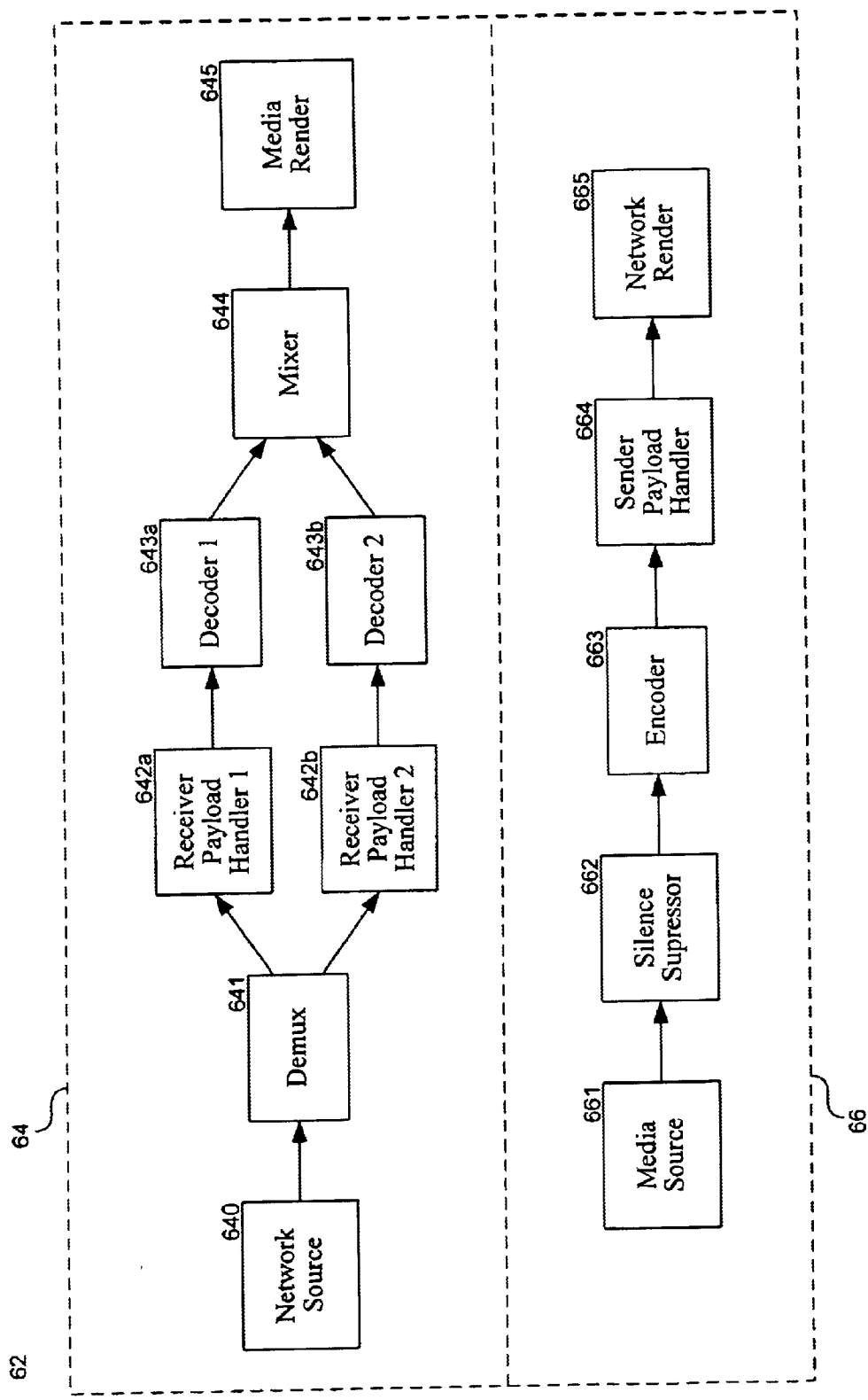
FIG. 2 is a partial block diagram of multimedia communications software 60, which is a part computer system 10.

Of particular relevance to the present invention is an augmented DirectShow multimedia software 62 included as one of application programs 36. FIG. 2, a partial block diagram, shows that software 62 includes two parts: a receiver portion 64 and a sender portion 66. Receiver portion 64, which receives and processes incoming multimedia data, includes a media source 640, a demultiplexer (demux) module 641, one or more receiver payload handlers 642a and 642b, and one or more corresponding decoder modules 643a and 643b, audio mixer module 644, and media rendering (or playback) module 645. As explained in detail in the operations discussion below, these modules cooperate with other portions of system 10 to perform the primary functions of supporting streaming of multimedia data and network conferencing using more than one communications protocol. Sender portion 66, which prepares data internal to computer system 10 for transmission to other computer systems, for example during network conferencing, includes a media source module 661, a silence suppressor 662, an encoder 663, a sender payload handler 664, and a network rendering module 665. (Although this exemplary embodiment adopts this functional division, other functional divisions are feasible and thus lie within the scope of the present invention.)

System 10, as FIG. 1 shows, accepts user commands and information through input devices such as a keyboard 40 and pointing device 42. Other input devices (not shown) include a microphone, joystick, game pad, satellite dish, scanner, or the like. These and other input devices are often connected to processing unit 21 through a serial port interface 46 that is coupled to the system bus, but can be connected by other interfaces, such as a parallel port, game port, or a universal serial bus (USB). A monitor 47 or other type of display device is also connected to system bus 23 via an interface, such as a video adapter 48. In addition to the monitor, computers typically include other peripheral output devices (not shown), such as speakers and printers.

Computer 20 can operate in a networked environment using logical connections to one or more remote computers, such as remote computer 49. These logical connections are achieved by a communication device coupled to or a part of computer 20. However, the invention is not limited to a particular type of communications device. Remote computer 49, which may be another computer, a server, a router, a network personal computer (PC), a client, a peer device or other common network node, typically includes many or all of the elements of computer 20, although FIG. 1 only shows a memory storage device 50. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, computer 20 is connected to the local network 51 through a network interface or adapter 53, which is one type of communications device. When used in a WAN-networking environment, computer 20 typically includes a modem 54, a type of communications device, or any other type of communications device for establishing communications over wide area network 52, such as the Internet. Modem 54, which may be internal or external, is connected to system bus 23 via serial port interface 46. In a networked environment, program modules depicted relative to personal computer 20, or portions thereof, may be stored in the remote memory storage device. It is appreciated that the network connections shown are exemplary and other means of and communications devices for establishing a communications link between the computers may be used.

The exemplary computer may be a conventional computer, a distributed computer, or any other type of computer, since the invention is not limited to any particular computer. A distributed computer typically includes one or more processing units as its processor, and a computer-readable medium such as a memory. The computer may also include a communications device such as a network adapter or a modem, so that it is able to communicatively couple with other computers to form a computer network.

Operation of the Exemplary Computer System

The invention primarily concerns operation of augmented DirectShow software 62, which as already noted is one of application programs 36 and has the exemplary structure shown in FIG. 2. The following description describes operation of receiving portion 64 and sending portion 66 during an audio-video conference with remote computer 49 via network 51 or 52. However, the principles inherent to this one-on-one conference are equally applicable to conferences with three or more participants and to other communication scenarios.

Receiver portion 64, which includes a network source 640, demultiplexer module 641, one or more receiver payload handlers 642a and 642b for specific payload types, and one or more corresponding decoder modules 643a and 643b, audio mixer module 644, and media rendering (or playback) module 645. Network Source receives and validates data packets based on their headers, each of which identifies the format, or payload type, of its packet. Validation also includes discarding duplicates and rejecting "old" packets. In some embodiments, validation also includes matching Synchronization Sources (SSRCs) to IP addresses. Examples of data types include audio G.711, audio G.723.1, video H.261, and video H.263. The validated data then passes to demux module 641, which separates and routes the data packets based on their payload type to specific parts of the receive chain for further type-specific processing.

More precisely, demux module 641, in the exemplary embodiment, passes the data to either receiver payload handler 642a or 642b, whichever is appropriate to the specific payload type. In the exemplary embodiment, demux module 641 routes data based on SSRCs and payload type. Although the exemplary embodiment shows only two payload handlers, other embodiments provide as many as possible to accommodate a wide, if not exhaustive, variety of data types.

In addition, the exemplary demux module 641 includes unique features for handling large, multiparty conferences, for example, those having tens, hundreds, or even thousands of parties. In this context, demux module 641 singles out a limited number of the incoming data streams and dynamically maps, or routes, this subset of streams to the output modules, or filters, for further processing and eventual rendering. This dynamic mapping mechanism limits the number of concurrent speakers that a conference client can actively hear during the multiparty conference to a manageable number, both from the perspective of a listening party and system processing capability.

To this end, demux module 641 monitors incoming data stream activity for each conference party, or speaker, and decides to map or not to map the data stream to downstream modules for further processing based on the active or inactive status of the stream. Demux module 641 also monitors for new speakers. If a new speaker is detected, for example, based on detection of a new SSRC field in an incoming data packet, and one of the currently mapped streams has been inactive for a certain timeout period, demux module 641 replaces the inactive stream with the new stream. And if necessary, demux module 641 maps it to a different type-specific payload handler and decoder.

The payload handlers perform functions necessary to ensure proper decoding of the data. Example of such functions, all of which are well known, include reassembling or combining several data packets into a larger data package, reordering a received sequence of data packets, detecting and rejecting duplicated packets, or computing and compensating delay jitter.

Receiver payload handler 642a and 642b then pass on the data to respective decoder modules 643a and 642b, which independently decode the data to forms appropriate to rendering, or playback, by appropriate components of computer system 10. In the exemplary embodiment, this entails restoring the packetized data to a form which, barring any transmission or reception errors, resembles its form prior to being transmitted across network 51 or 52 by remote computer 49. After decoding, video data passes directly to media rendering module 645 for playback. Audio data, on the other hand, passes first to mixer 644, which combines acoustic information coming from several sources into a single audio stream compatible with media rendering module 645. Media rendering module 645 is generally associated with a video window, a data file, a sound card, or other audio or video transducer. (The exemplary embodiment associates media rendering module 645 with a call-control module (not shown) and processes H.323 media formats using the H.245 protocol.)

A user of system 10 can also rely on sender portion 66 of augmented DirectShow software 62 to transmit audio-only or audio-video data (as well as other types of data) back to remote computer 49. In the exemplary embodiment, system 10 responds with the same format of data as it received; however, other embodiments respond with data having respond with a different format. In general, data passes from module to module of sender portion 66, which includes media source module 661, silence supressor 662, encoder 663, a sender payload handler 664, and a network rendering module 665, before being transmitted across network 51 or 52 to computer 49.

More specifically, the data, such as audio samples or a video frame, intended for transmission originate from media source module 661 and then proceed to encoder module 663. Media source 661 is associated with a camera, video-capture board, a sound card coupled to a microphone, or other audio source such as a radio, cassette player, compact-disc player, or an audio, video, or audio-video file. In the case of audio data, the data passes first through silence suppressor 663 to reject data, for example, silences or low-level background sounds, which provide little or no useful information and would otherwise waste available bandwidth. However if the data is not audio, it passes directly to encoder 663, which converts the data, according to conventional techniques, into a more compact form to conserve bandwidth.

Encoder 663 passes the compacted data to sender payload handler 664, and handler 664 converts it to a form suitable for transmission over a packet switched network, network 50 or 51 for example. For video data, this conversion includes splitting a video frame into smaller pieces or subframes according to conventional techniques. Network rendering module 664 then sends the subdivided data onto the network, adding headers according to a specific transport protocol. Examples of suitable transport protocols include UDP, TCP, HTTP, and ATM.

In the exemplary embodiment, network source and network rendering module 664 support conventional streaming, bandwidth reservation, communications quality, telephony, and encryption protocols. Examples of protocols or application program interfaces supported by these modules include RTP (real-time transport protocol), RTCP (real-time transport control protocol), RSVP (resource reservation protocol), QOS (quality of service), GQOS (generic quality of service), TAPI 3.0 (telephony interface) and CryptoAPI (cryptographic application program interface). Further information on these aspects of the exemplary embodiment are publicly available in numerous RFCs (request for comments), SDKs (software development kits), and DDKs (device driver kits) as well as other sources. For instance, RFC 1889 entitled RTP: A Transport Protocol for Real-Time Applications (January 1996) and RFC 1890 entitled RTP Profile for Audio and Video Conferences with Minimal Control (January 1996) describe relevant aspects of the type of streaming supported in the exemplary embodiment.

Many conditions that occur in RTP, RTCP, QOS, and local computer-system are signaled up through DirectShow events, that is, short messages that the filters send to a user of the filter graph. These include, for example, detection of a new participant, detection of departing session participant, presence of QOS receivers or senders, no memory or network (socket) errors. The RTCP protocol allows the exchange of network information through the RTCP reports. This information can serve a variety of purposes, including, for example, modifying the rate media source module 661 produces data, modifying bit output rate of encoder 663, or even selecting an alternative encoder (or encoding protocol) for sender portion 66. This kind of feedback response ultimately adapts the characteristics of sender portion 66 toward an optimal quality level for a given set of network resources.

CONCLUSION

In furtherance of the art, the inventors devised several new software modules, or filters, for addition to Microsoft's DirectShow software. Some of the modules allow the DirectShow software to support streaming and network conferencing using more than one communications protocol. For example, one module supports the Real-time Transport Protocol for streaming and another routes incoming network data, based on its type, to type-specific data handlers and decoders.

The embodiments described above are intended only to illustrate and teach one or more ways of practicing or implementing the present invention, not to restrict its breadth or scope. The actual scope of the invention, which embraces all ways of practicing or implementing the invention, is defined only by the following claims and their equivalents.

What is claimed is:

1. A system in a network conferencing environment for delivering a plurality of video or audio signals, the system comprising:

a plurality of transmitters configured to transmit a set of data streams onto a network, wherein the set of data streams is generated from the plurality of video or audio signals, the audio signals containing useful information and silences or background, and wherein at least one of the transmitters includes a silence suppressor for removing the silences or background while continuing to transmit the useful information from the data streams of the audio signals transmitted by the said at least one transmitter; and at least one receiver for receiving the set of data streams from the network and recovering the data streams into audio or video signals, the receiver including a demultiplexer for dynamically selecting a subset of the set of data streams based on a source identifier and a payload type and two or more receiver payload handler modules and two or more corresponding decoder modules for handling and decoding two or more types of the data streams.

2. The system of claim 1 wherein one of the payload handler modules handles audio G.711 data and another handles audio G.723.1 data and one or more of the decoder modules decodes audio G.711 data and another decodes audio G.723.1 data.

3. The computer system of claim 2 wherein the demultiplexer is operatively coupled to the one or more decoders for routing data to one of the decoders based on the source identifier and the payload type.

4. The computer system of claim 1 further including an audio mixer operatively coupled to the two or more corresponding decoders.

5. The computer system of claim 1 further including a media rendering module operatively coupled to the one or more decoders.

6. The computer system of claim 1 wherein one or more of the payload handlers includes: means for reassembling or combining two or more data packets, means for reordering data packets, means for detecting and rejecting duplicate data packets, or means for computing and compensating delay jitter.

7. The system of claim 1, wherein the data streams in the selected subset are most recently activated data steams.

8. The system of claim 1, wherein the source identifier is a synchronization source identifier (SSRC).

* * * * *